(12) United States Patent
Chang et al.

(10) Patent No.: US 9,726,335 B2
(45) Date of Patent: Aug. 8, 2017

(54) PHOSPHOR DEVICE AND MANUFACTURING METHOD THEREOF HAVING A SECOND PHOSPHOR AGENT TO INCREASE THE LUMINOUS INTENSITY OF A CONVERTED COLOR LIGHT

(71) Applicant: Delta Electronics, Inc., Taoyuan (TW)

(72) Inventors: Keh-Su Chang, Taoyuan (TW); Yen-I Chou, Taoyuan (TW); Chi Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 37 days.

(21) Appl. No.: 14/979,128

(22) Filed: Dec. 22, 2015

(65) Prior Publication Data

US 2016/0116122 A1 Apr. 28, 2016

Related U.S. Application Data

(63) Continuation-in-part of application No. 14/478,579, filed on Sep. 5, 2014, now Pat. No. 9,274,407, which
(Continued)

(51) Int. Cl.
*F21K 9/64* (2016.01)
*F21K 99/00* (2016.01)
(Continued)

(52) U.S. Cl.
CPC .......... *F21K 9/56* (2013.01); *B05D 5/06* (2013.01); *F21V 9/08* (2013.01); *F21V 9/16* (2013.01);
(Continued)

(58) Field of Classification Search
CPC ..... F21K 9/64; F21V 9/16; F21V 9/08; H01L 33/502; H01L 33/504
(Continued)

(56) References Cited

U.S. PATENT DOCUMENTS 3,999,062 A 12/1976 Demsky et al.
5,998,925 A 12/1999 Shimizu et al.
(Continued)

FOREIGN PATENT DOCUMENTS

CN 1547266 11/2004
CN 1837893 9/2006
(Continued)

*Primary Examiner* — Que T Le
(74) *Attorney, Agent, or Firm* — Kirton McConkie; Evan R. Witt

(57) ABSTRACT

A phosphor device of an illumination system, which emits a first waveband light, includes a substrate and a first phosphor layer. The first phosphor layer includes a first phosphor agent and a second phosphor agent. The first phosphor agent is formed on the substrate for converting the first waveband light into a second waveband light. The second waveband light comprises a first color light and a second color light. The second phosphor agent is distributed over the first phosphor agent for converting the first waveband light into the second color light so as to increase the luminous intensity of the second color light. Therefore, the luminous intensity of the second color light can be effectively increased.

22 Claims, 11 Drawing Sheets

Related U.S. Application Data is a continuation-in-part of application No. 13/617,201, filed on Sep. 14, 2012, now Pat. No. 9,024,241.

(60) Provisional application No. 61/537,687, filed on Sep. 22, 2011.

(51) Int. Cl.
| | |
|---|---|
| *F21V 9/16* | (2006.01) |
| *F21V 9/08* | (2006.01) |
| *B05D 5/06* | (2006.01) |
| *G03B 21/20* | (2006.01) |
| *H04N 9/31* | (2006.01) |

(52) U.S. Cl.
CPC ......... *G03B 21/204* (2013.01); *H04N 9/3105* (2013.01); *H04N 9/3114* (2013.01); *H04N 9/3158* (2013.01); *H04N 9/3164* (2013.01); *B32B 2307/422* (2013.01)

(58) Field of Classification Search
USPC .................................................. 250/226, 216
See application file for complete search history.

(56) References Cited

U.S. PATENT DOCUMENTS

| | | | |
|---|---|---|---|
| 6,294,800 B1 | 9/2001 | Duggal et al. | |
| 6,685,852 B2 | 2/2004 | Setlur et al. | |
| 6,884,671 B2 | 4/2005 | Jenq | |
| 7,547,114 B2 | 6/2009 | Li et al. | |
| 7,654,681 B2 | 2/2010 | Kim et al. | |
| 7,737,621 B2 | 6/2010 | Masuda et al. | |
| 7,863,635 B2 | 1/2011 | Andrews et al. | |
| 7,906,892 B2 | 3/2011 | Choi et al. | |
| 8,173,974 B2 | 5/2012 | Zheng et al. | |
| 8,556,437 B2 | 10/2013 | Miyake | |
| 8,562,141 B2 | 10/2013 | Ogino | |
| 8,662,678 B2 | 3/2014 | Hirata et al. | |
| 8,733,940 B2 | 5/2014 | Tanaka et al. | |
| 9,159,885 B2 * | 10/2015 | Ouderkirk | H01L 25/0753 |
| 9,175,830 B2 | 11/2015 | Yang et al. | |
| 2005/0184298 A1 | 8/2005 | Ueda | |
| 2005/0206301 A1 | 9/2005 | Ng | |
| 2005/0270775 A1 | 12/2005 | Harbers et al. | |
| 2006/0226759 A1 | 10/2006 | Masuda et al. | |
| 2008/0158873 A1 | 7/2008 | Bierhuizen et al. | |
| 2008/0211386 A1 | 9/2008 | Choi et al. | |
| 2009/0034284 A1 | 2/2009 | Li et al. | |
| 2009/0039375 A1 | 2/2009 | LeToquin et al. | |
| 2009/0051884 A1 | 2/2009 | Kuan et al. | |
| 2010/0213821 A1 | 8/2010 | Masuda et al. | |
| 2010/0220298 A1 | 9/2010 | Wang et al. | |
| 2010/0264448 A1 | 10/2010 | Choi et al. | |
| 2010/0314650 A1 | 12/2010 | Sugimori | |
| 2010/0315320 A1 | 12/2010 | Yoshida | |
| 2010/0328626 A1 | 12/2010 | Miyazaki | |
| 2011/0018026 A1 | 1/2011 | Konno et al. | |
| 2011/0043761 A1 | 2/2011 | Miyamae | |
| 2011/0051095 A1 | 3/2011 | Narimatsu et al. | |
| 2011/0057118 A1 | 3/2011 | Zheng et al. | |
| 2011/0063581 A1 | 3/2011 | Iwanaga | |
| 2011/0089456 A1 | 4/2011 | Andrews et al. | |
| 2011/0149549 A1 | 6/2011 | Miyake | |
| 2011/0188010 A1 | 8/2011 | Lin et al. | |
| 2011/0199580 A1 | 8/2011 | Hirata et al. | |
| 2011/0205502 A1 | 8/2011 | Kato et al. | |
| 2011/0227477 A1 | 9/2011 | Zhang et al. | |
| 2011/0228232 A1 | 9/2011 | Sakata et al. | |
| 2011/0228514 A1 | 9/2011 | Tong et al. | |
| 2011/0248296 A1 | 10/2011 | Choi et al. | |
| 2011/0261326 A1 | 10/2011 | Wang et al. | |
| 2011/0310353 A1 | 12/2011 | Maeda | |
| 2011/0310362 A1 | 12/2011 | Komatsu | |
| 2012/0039065 A1 | 2/2012 | Sun et al. | |
| 2012/0267998 A1 | 10/2012 | Sohn et al. | |
| 2013/0050654 A1 | 2/2013 | Hu et al. | |
| 2013/0228812 A1 | 9/2013 | Annen et al. | |
| 2013/0234591 A1 | 9/2013 | Hattori et al. | |
| 2014/0146293 A1 | 5/2014 | Hirata et al. | |
| 2015/0098070 A1 | 4/2015 | Hsieh et al. | |
| 2015/0184066 A1 | 7/2015 | Kwon et al. | |

FOREIGN PATENT DOCUMENTS

| | | |
|---|---|---|
| CN | 1929155 | 3/2007 |
| CN | 101212015 | 7/2008 |
| CN | 101562227 | 10/2009 |
| CN | 101650311 | 2/2010 |
| CN | 201717287 | 1/2011 |
| CN | 101995748 | 3/2011 |
| CN | 102073115 | 5/2011 |
| CN | 102155639 | 8/2011 |
| CN | 202109406 | 1/2012 |
| CN | 102650811 | 8/2012 |
| EP | 2339655 | 6/2011 |
| EP | 2360523 | 8/2011 |
| EP | 2355524 | 10/2011 |
| EP | 2749943 | 2/2014 |
| JP | 2003295319 | 10/2003 |
| JP | 2004325874 | 11/2004 |
| JP | 2007156270 | 6/2007 |
| JP | 2008124504 A | 5/2008 |
| JP | 2009245712 | 10/2009 |
| JP | 2009277516 | 11/2009 |
| JP | 2010515096 A | 5/2010 |
| JP | 2011048139 A | 3/2011 |
| JP | 2011071404 | 4/2011 |
| JP | 2011100163 | 5/2011 |
| JP | 2011128522 A | 6/2011 |
| JP | 2011165555 | 8/2011 |
| JP | 2011168627 A | 9/2011 |
| JP | 2011175000 | 9/2011 |
| JP | 2011197212 | 10/2011 |
| JP | 2012137744 | 7/2012 |
| JP | 2012203366 | 10/2012 |
| TW | 200912475 A | 3/2009 |
| TW | 201000617 A | 1/2010 |
| TW | 201251136 A | 12/2012 |
| TW | 201418414 A | 5/2014 |
| WO | 2012135744 | 10/2012 |
| WO | 2013-029463 | 7/2013 |

* cited by examiner

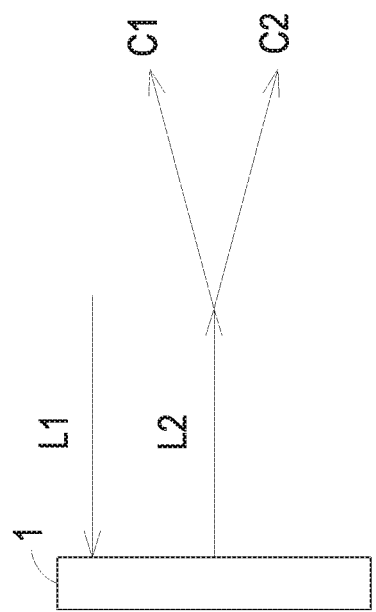

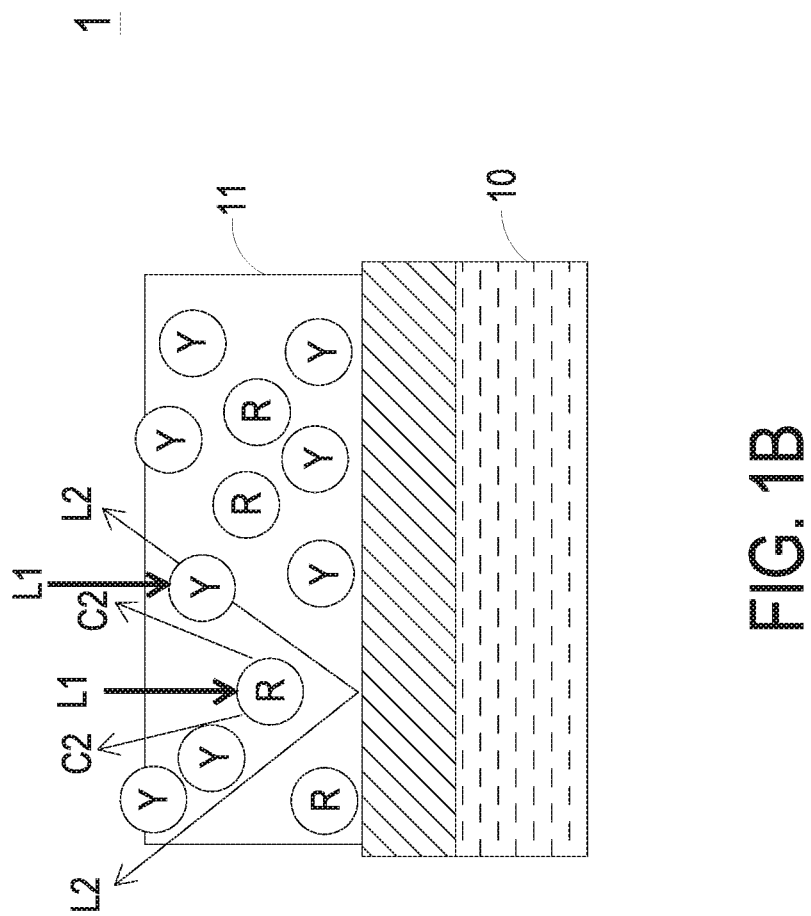

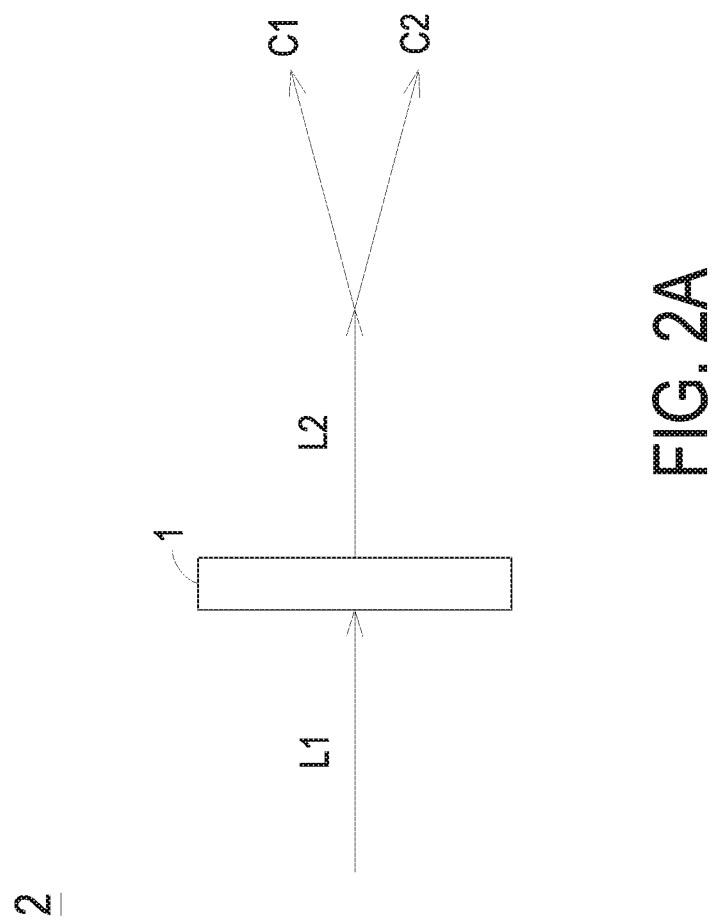

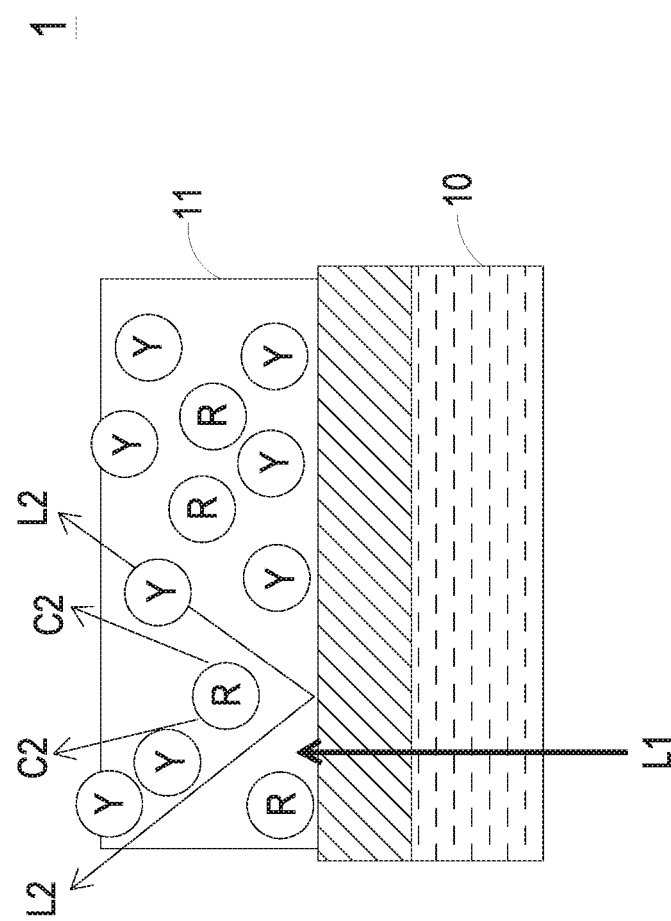

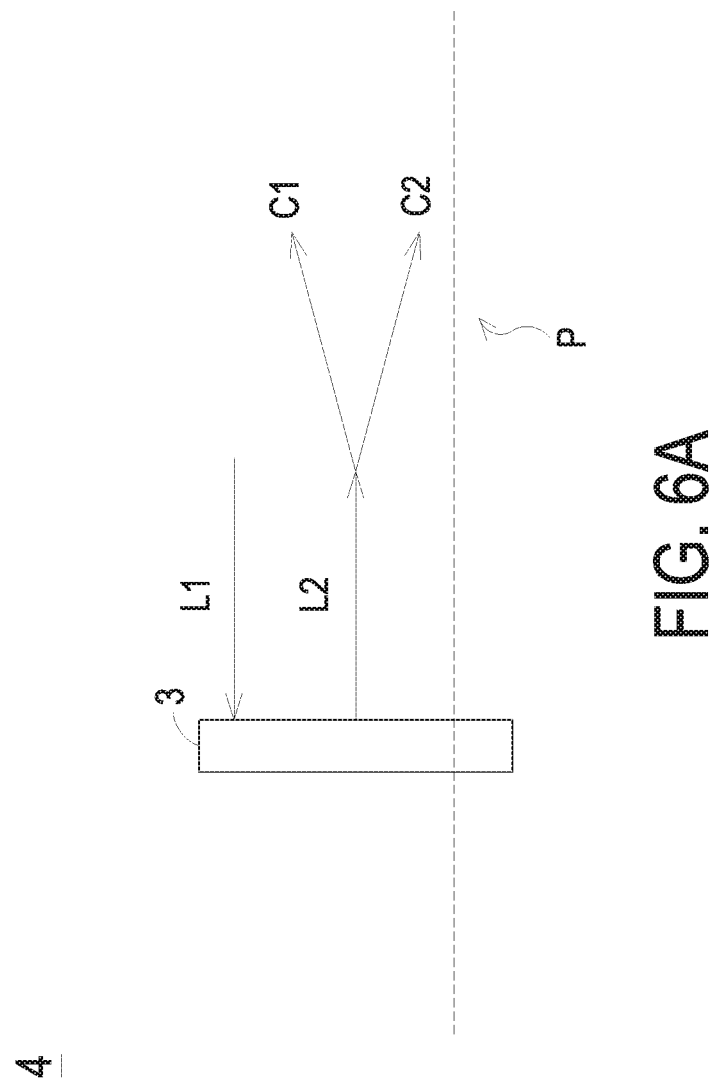

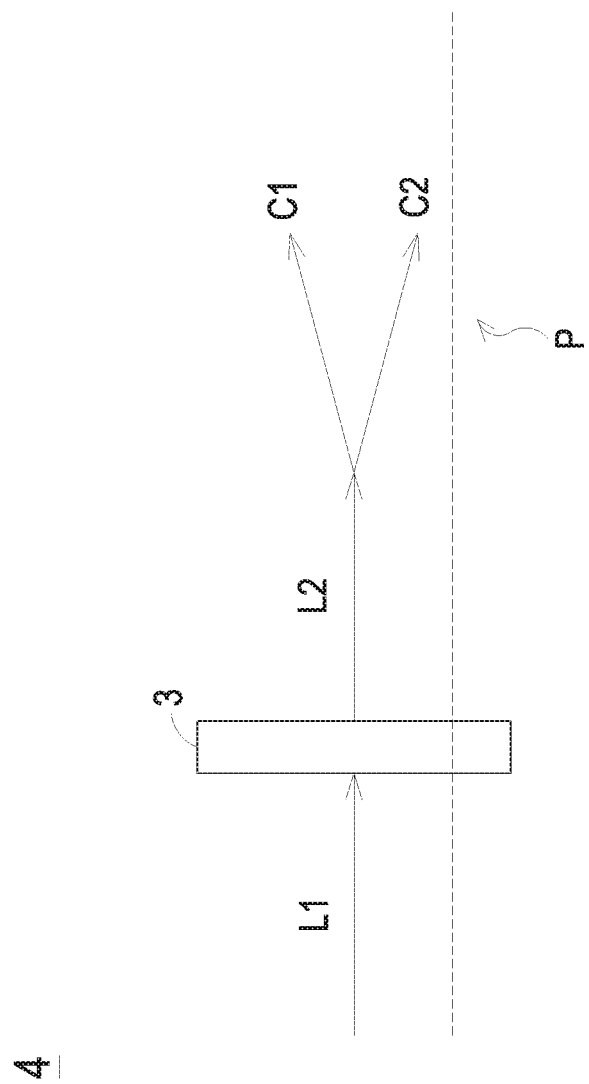

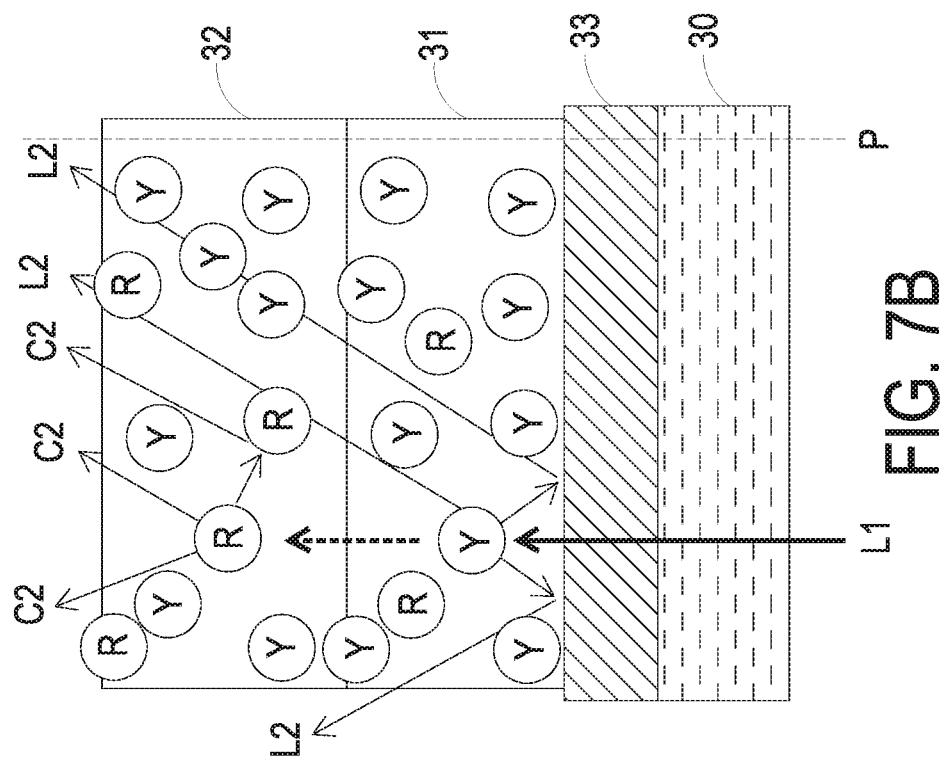

PHOSPHOR DEVICE AND MANUFACTURING METHOD THEREOF HAVING A SECOND PHOSPHOR AGENT TO INCREASE THE LUMINOUS INTENSITY OF A CONVERTED COLOR LIGHT

CROSS-REFERENCE TO RELATED APPLICATION

This application is a continuation-in-part application of U.S. application Ser. No. 14/478,579 filed on Sep. 5, 2014, which is a continuation application of U.S. Nonprovisional application Ser. No. 13/617,201 filed on Sep. 14, 2012 that claims the benefit of U.S. Provisional Application Ser. No. 61/537,687 filed on Sep. 22, 2011, the entirety of which is hereby incorporated by reference.

FIELD OF THE INVENTION

The present invention relates to a phosphor device, and more particularly to a phosphor device and a manufacturing method thereof.

BACKGROUND OF THE INVENTION

In recent years, a variety of projectors have been widely used in various video applications. For example, projectors can be used for making presentations, holding meetings or giving lectures in classrooms, boardrooms, conference rooms or home theaters. By the projector, an image signal from an image signal source can be enlarged and shown on a display screen. For reducing power consumption and overall volume, the illumination system of the current projector employs a solid-state light-emitting element (e.g. light emitting diode or laser diode) to replace the conventional high intensity discharge (HID) lamp.

Generally, the illumination system of the projector may emit three primary color lights, i.e. a red light (R), a green light (G) and a blue light (B). Among three primary color solid-state light-emitting elements including a red solid-state light-emitting element, a green solid-state light-emitting element and a blue solid-state light-emitting element, the blue solid-state light-emitting element has the highest luminous efficiency. Since the red solid-state light-emitting element and the green solid-state light-emitting element have poor luminous efficiency, the red light or the green light may be produced by using a blue solid-state light-emitting element and a wavelength conversion device (e.g. a phosphor wheel). That is, the uses of the blue solid-state light-emitting element and the phosphor wheel may directly emit the red light or the green light in replace of the red solid-state light-emitting element or the green solid-state light-emitting element. Consequently, the luminous efficiency of the whole illumination system is enhanced and the manufacturing cost of the illumination system is reduced.

However, it still has some drawbacks of using a solid-state light-emitting element to emit an exciting light and a phosphor wheel to convert the wavelength of the exciting light. When using a solid-state light-emitting element and a phosphor wheel coated with a phosphor agent to emit an excited light to be separated as color lights for projecting, the luminous intensity or the saturation level of a color light may be not enough.

Therefore, there is a need of providing an improved illumination system and an improved projection apparatus in order to eliminate the above drawbacks.

SUMMARY OF THE INVENTION

It is an object of the present invention to provide a phosphor device and a manufacturing method thereof for overcoming at least one of the above-mentioned drawbacks encountered by the prior arts.

The present invention provides a phosphor device and a manufacturing method thereof. By utilizing a phosphor layer including a first phosphor agent and a second phosphor agent, the luminous intensity of a color light, which is included in a second waveband light converted by the first phosphor agent, can be increased through the conversion of the second phosphor agent.

The present invention also provides a phosphor device and a manufacturing method thereof. Since a second phosphor layer including a first phosphor agent and a second phosphor agent is formed behind a first phosphor layer includes only the first phosphor agent along an optical path, most of the energy of a first waveband light is decreased by the first phosphor agent of the first phosphor layer, such that the conversion efficiency of the second phosphor agent is enhanced.

In accordance with an aspect of the present invention, there is provided a phosphor device of an illumination system emitting a first waveband light. The phosphor device includes a substrate and a first phosphor layer. The first phosphor layer includes a first phosphor agent and a second phosphor agent. The first phosphor agent is formed on the substrate for converting the first waveband light into a second waveband light. The second waveband light includes a first color light and a second color light. The second phosphor agent is distributed over the first phosphor agent for converting the first waveband light into the second color light so as to increase the luminous intensity of the second color light.

In accordance with another aspect of the present invention, there is provided a phosphor device of an illumination system. The illumination system emits a first waveband light along an optical path. The phosphor device includes a substrate, a first phosphor layer and a second phosphor layer. The substrate is disposed on the optical path. The first phosphor layer is formed on a side of the substrate. The second phosphor layer is formed behind the first phosphor layer along the optical path. The first phosphor layer includes a first phosphor agent and x weight percent of a second phosphor agent. The second phosphor layer includes the first phosphor agent and y weight percent of the second phosphor agent, and y is greater than x. The first waveband light is converted into a second waveband light by the first phosphor agent. The second waveband light includes a first color light and a second color light. The first waveband light is converted into the second color light by the second phosphor agent, thereby increasing the luminous intensity of the second color light.

In accordance with a further aspect of the present invention, there is provided a manufacturing method of a phosphor device. The manufacturing method includes steps of providing a substrate, forming a first phosphor layer on the substrate, in which the first phosphor layer includes a first phosphor agent for converting a first waveband light into a second waveband light and the second waveband light includes a first color light and a second color light, and adding a second phosphor agent in the first phosphor layer for converting the first waveband light into the second color light, thereby increasing the luminous intensity of the second color light outputted by the phosphor device.

In accordance with a further aspect of the present invention, there is provided a manufacturing method of a phosphor device. The manufacturing method includes steps of providing a reflective substrate, forming a first phosphor layer on the reflective substrate, in which the first phosphor layer includes a first phosphor agent for converting a first waveband light into a second waveband light and the second waveband light includes a first color light and a second color light, adding a second phosphor agent in the first phosphor layer for converting the first waveband light into the second color light, thereby increasing the luminous intensity of the second color light outputted by the phosphor device, and forming a second phosphor layer on the first phosphor layer. The second phosphor layer includes the first phosphor agent for converting the first waveband light into the second waveband light and decreasing the energy of the first waveband light.

In accordance with a further aspect of the present invention, there is provided a manufacturing method of a phosphor device. The manufacturing method includes steps of providing a transmissive substrate, forming a second phosphor layer on the transmissive substrate, in which the second phosphor layer includes a first phosphor agent for converting a first waveband light into a second waveband light and decreasing the energy of the first waveband light, forming a first phosphor layer on the second phosphor layer, in which the first phosphor layer includes the first phosphor agent for converting the first waveband light into the second waveband light and the second waveband light includes a first color light and a second color light, and adding a second phosphor agent in the first phosphor layer for converting the first waveband light into the second color light, thereby increasing the luminous intensity of the second color light outputted by the phosphor device.

The above contents of the present invention will become more readily apparent to those ordinarily skilled in the art after reviewing the following detailed description and accompanying drawings, in which:

BRIEF DESCRIPTION OF THE DRAWINGS

FIG. 1A schematically illustrates a phosphor device including a reflective substrate and an illumination system including the phosphor device according to an embodiment of the present invention;

FIG. 1B schematically illustrates the structure of the phosphor device as shown in FIG. 1A;

FIG. 2A schematically illustrates a phosphor device including a transmissive substrate and an illumination system including the phosphor device according to an embodiment of the present invention;

FIG. 2B schematically illustrates the structure of the phosphor device as shown in FIG. 2A;

FIG. 6A schematically illustrates a phosphor device including a reflective substrate and an illumination system including the phosphor device according to an embodiment of the present invention;

FIG. 7A schematically illustrates a phosphor device including a transmissive substrate and an illumination system including the phosphor device according to an embodiment of the present invention; and FIG. 7B schematically illustrates the structure of the phosphor device as shown in FIG. 7A.

DETAILED DESCRIPTION OF THE PREFERRED EMBODIMENT

Figure 3:
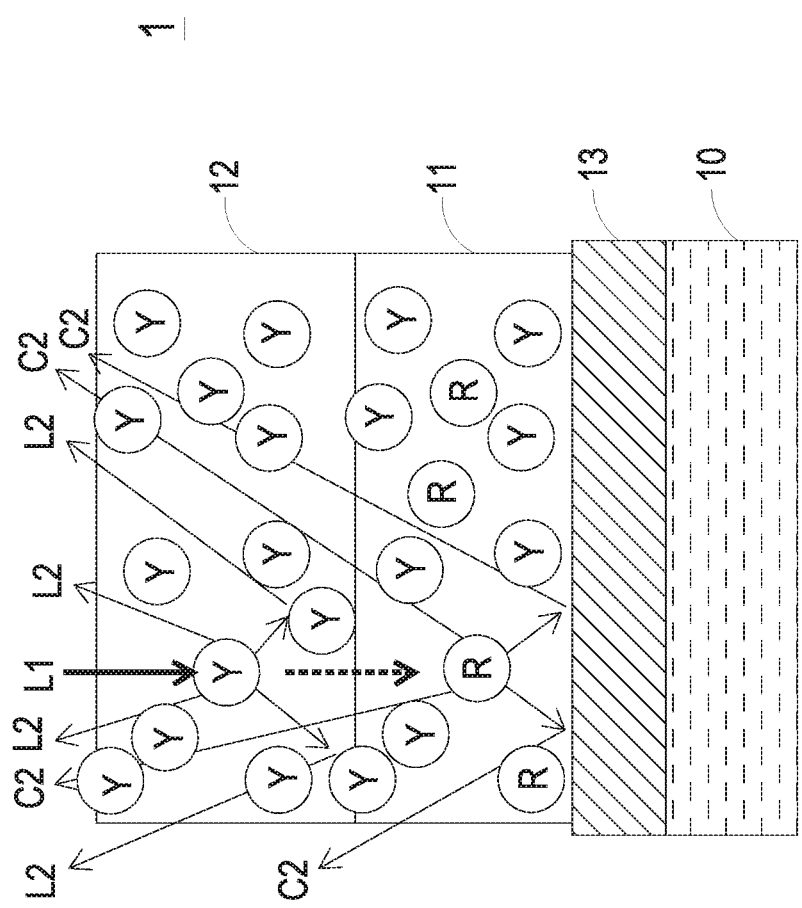
FIG. 3 schematically illustrates the structure of a phosphor device including a reflective substrate according to an embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

FIG. 1A schematically illustrates a phosphor device including a reflective substrate and an illumination system including the phosphor device according to an embodiment of the present invention. FIG. 1B schematically illustrates the structure of the phosphor device as shown in FIG. 1A. As shown in FIG. 1A and FIG. 1B, a phosphor device 1 of an illumination system 2, in which the illumination system 2 emits a first waveband light L1, includes a substrate 10 and a first phosphor layer 11. The first phosphor layer 11 includes a first phosphor agent Y and a second phosphor agent R. The first phosphor agent Y is formed on the substrate 10 for converting the first waveband light L1 into a second waveband light L2. The second waveband light L2, which could be separated by optical device for projecting, includes a first color light C1 and a second color light C2. The second phosphor agent R is distributed over the first phosphor agent Y for converting the first waveband light L1 into the second color light C2 so as to increase the luminous intensity of the second color light C2.

It should be noted that in a manufacturing method of the phosphor device 1, after the substrate 10 is provided, the first phosphor layer 11 including the first phosphor agent Y and the second phosphor agent R is formed on the substrate 10. The second phosphor agent R is utilized for converting the first waveband light L1 into enhancing the second color light C2, thereby increasing the luminous intensity of the second color light C2 outputted by the phosphor device 1. The second phosphor agent R can be added in the first phosphor layer 11 with an average distribution or a gradient distribution, such that the second phosphor agent R is distributed over the first phosphor agent Y. Certainly, the second phosphor agent R can be mixed with the first phosphor agent Y as a mixture in a mixing manner. Alternatively, the second phosphor agent R and the first phosphor agent Y can be formed as a plurality of segments. The segments are for example arranged on the first phosphor layer 11 with a pie-shaped distribution, but not limited thereto. The segment each includes the first phosphor agent Y or the second phosphor R, or every one of the segment includes the first phosphor agent Y and the second phosphor agent R simultaneously.

In this embodiment and the following embodiments, the first phosphor agent Y is for example a yellow phosphor agent, but not limited thereto. Meanwhile, the second phosphor agent R is for example a red phosphor agent, but not limited thereto. In some situations, the second phosphor agent R may be a green phosphor agent. The primary spirit of the second phosphor agent R is to enhance the intensity and adjust the color saturation level of at least one of the color lights included in the excited light (the second waveband light L2), which is excited by the first phosphor agent Y. Furthermore, the symbols (letters) "Y" and "R" are illustrated for indicating the first phosphor agent and the second phosphor agent but not for limiting the colors of the first phosphor agent and the second phosphor agent.

FIG. 2A schematically illustrates a phosphor device including a transmissive substrate and an illumination system including the phosphor device according to an embodiment of the present invention. FIG. 2B schematically illustrates the structure of the phosphor device as shown in FIG. 2A. As shown in FIG. 2A and FIG. 2B, a phosphor device 1 of an illumination system 2 includes a substrate 10 and a first phosphor layer 11. The first phosphor layer 11 is similar with the first phosphor layer 11 described in the previous embodiment, and is not redundantly described herein. In this embodiment, the substrate 10 is a transmissive substrate.

It should be noted that the phosphor device 1 of the present invention can be considered or realized in another way. In an embodiment, the first phosphor layer 11 is formed on the substrate and comprising a first ingredient and a second ingredient. The first ingredient can be the first phosphor agent, and so does the second ingredient. Furthermore, the first waveband light L1 is converted into a first color light C1 and a second color light C2 by the first ingredient. The second ingredient is distributed over the first ingredient for converting the first waveband light L1 into a third color light, in which the range of the spectrum of the second color light C2 and the range of the spectrum of the third color light are at least partially overlapped, and the first color light C1, the second color light C2 and the third color light are integrated as the second waveband light L2. Since the range of the spectrum of the second color light C2 and the range of the spectrum of the third color light are at least partially overlapped, at least a portion of the intensity of the second color light C2 is increased.

On the other hand, when the third color light converted by the second ingredient is similar with the second color light C2 converted by the first ingredient, the range of the spectrum of the second color light C2 and the range of the spectrum of the third color light are completely overlapped, and the phosphor device 1 meets the embodiments mentioned above. That is, the range of the spectrum of the color light converted by the second ingredient can be selected or adjusted to meet the practical demands but not limited by the embodiments of the present invention.

FIG. 3 schematically illustrates the structure of a phosphor device including a reflective substrate according to an embodiment of the present invention. As shown in FIG. 1B and FIG. 3, the phosphor device 1 further includes a second phosphor layer 12. In some embodiments, the substrate 10 is a reflective substrate, and the second phosphor layer 12 is disposed on the first phosphor layer 11. The second phosphor layer 12 includes the first phosphor agent Y for converting the first waveband light L1 into the second waveband light L2 and decreasing the energy of the first waveband light L1. That is, when the incident light (i.e. the first waveband light L1) is transmitted through the second phosphor layer 12, a large portion of energy of the incident light is converted. For example, the residue power of the first waveband light L1 inputted into the phosphor layer 11 is less than 40 watts, but not limited thereto.

The thickness of each of the first phosphor layer 11 and the second phosphor layer 12 is greater than or equal to 10 micrometers (i.e. ≥10 μm), and less than or equal to 500 micrometers (i.e. ≤500 μm). In preferred embodiments, the thickness of each of the first phosphor layer 11 and the second phosphor layer 12 is greater than or equal to 50 micrometers (i.e. ≥50 μm), and less than or equal to 200 micrometers (i.e. ≤200 μm). It should be noted that the thickness of the first phosphor layer 11 can be equal to or unequal to the thickness of the second phosphor layer 12. In addition, the weight percentage of the second phosphor agent R is less than 85% relative to the first phosphor agent Y.

In this embodiment, the phosphor device 1 of the present invention further includes a reflective coating 13. The reflective coating 13 is disposed between the substrate 10 and the first phosphor layer 11 for reflecting at least the second waveband light L2. An example of the reflective coating 13 includes but not limited to an all reflective coating, or a dichroic coating. While utilizing a dichroic coating as the reflective coating 13, a color light having the similar range of wavelength with the second waveband light L2 can be reflected by the reflective coating 13. Certainly, the first color light C1 and the second color light C2 both can be reflected by the reflective coating 13. While utilizing a reflective coating, almost all of visible light is reflected by the reflective coating 13.

In a manufacturing method of the phosphor device 1 including a reflective substrate, after the reflective substrate is provided, the first phosphor layer 11 including the first phosphor agent Y and the second phosphor agent R is formed on the reflective substrate. The second phosphor agent R is utilized for converting the first waveband light L1 into the third color light as described above, thereby increasing the luminous intensity of the second color light C2 outputted by the phosphor device 1. Next, the second phosphor layer 12 is formed on the first phosphor layer 11. The second phosphor layer 12 includes the first phosphor agent Y for converting the first waveband light L1 into the second waveband light L2 and decreasing the energy of the first waveband light L1. Moreover, the reflective coating 13 can be pre-coated on the substrate 10, or be formed on the substrate while processing the manufacturing method.

Figure 4:
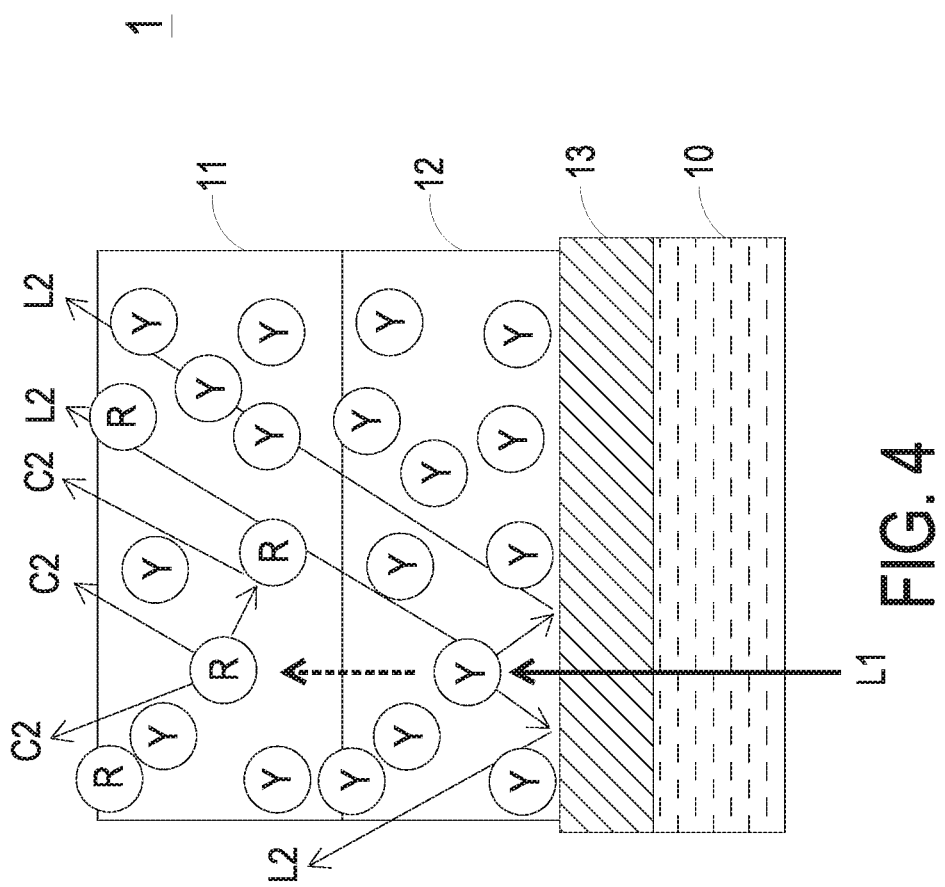
FIG. 4 schematically illustrates the structure of a phosphor device including a transmissive substrate according to an embodiment of the present invention.

Please refer to FIG. 2B and FIG. 4. FIG. 4 schematically illustrates the structure of a phosphor device including a transmissive substrate according to an embodiment of the present invention. In this embodiment, the phosphor device 1 further includes a second phosphor layer 12. The substrate 10 is a transmissive substrate, and the second phosphor layer 12 is disposed between the first phosphor layer 11 and the substrate 10. The second phosphor layer 12 includes the first phosphor agent Y for converting the first waveband light L1 into the second waveband light L2 and decreasing the energy of the first waveband light L1 simultaneously. That is, when the incident light (i.e. the first waveband light L1) is transmitted through the second phosphor layer 12, a large portion of energy of the incident light is converted. For example, the residue power of the first waveband light L1 inputted into the phosphor layer 11 is less than 40 watts, but not limited thereto.

The thickness of each of the first phosphor layer 11 and the second phosphor layer 12 is greater than or equal to 10 micrometers, and less than or equal to 500 micrometers. In preferred embodiments, the thickness of each of the first phosphor layer 11 and the second phosphor layer 12 is greater than or equal to 50 micrometers, and less than or equal to 200 micrometers. The weight percentage of the second phosphor agent R is less than 85% relative to the first phosphor agent Y.

In an embodiment, the phosphor device 1 of the present invention further includes a reflective coating 13. The reflective coating 13 is disposed between the substrate 10 and the second phosphor layer 12 for reflecting the second waveband light L2. An example of the reflective coating 13 includes but not limited to a dichroic coating. While utilizing a dichroic coating as the reflective coating 13, a color light having the similar range of wavelength with the first waveband light L1 can be passed through the reflective coating 13, and a color light having the similar range of wavelength with the second waveband light L2 can be reflected by the reflective coating 13.

In a manufacturing method of the phosphor device 1 including a transmissive substrate, after the transmissive substrate is provided, the second phosphor layer 12 including the first phosphor agent Y is formed on the transmissive substrate. The first phosphor layer 11 is then formed on the second phosphor layer 12. The first phosphor layer 11 includes the first phosphor agent Y for converting the first waveband light L1 into the second waveband light L2, and the second waveband light L2 comprises a first color light C1 and a second color light C2. Next, the second phosphor agent R is added in the first phosphor layer 11 for converting the first waveband light L1 into the second color light C2, thereby increasing the luminous intensity of the second color light C2 outputted by the phosphor device 1. Moreover, the reflective coating 13 can be pre-coated on the substrate 10, or be formed on the substrate while processing the manufacturing method.

Figure 5:
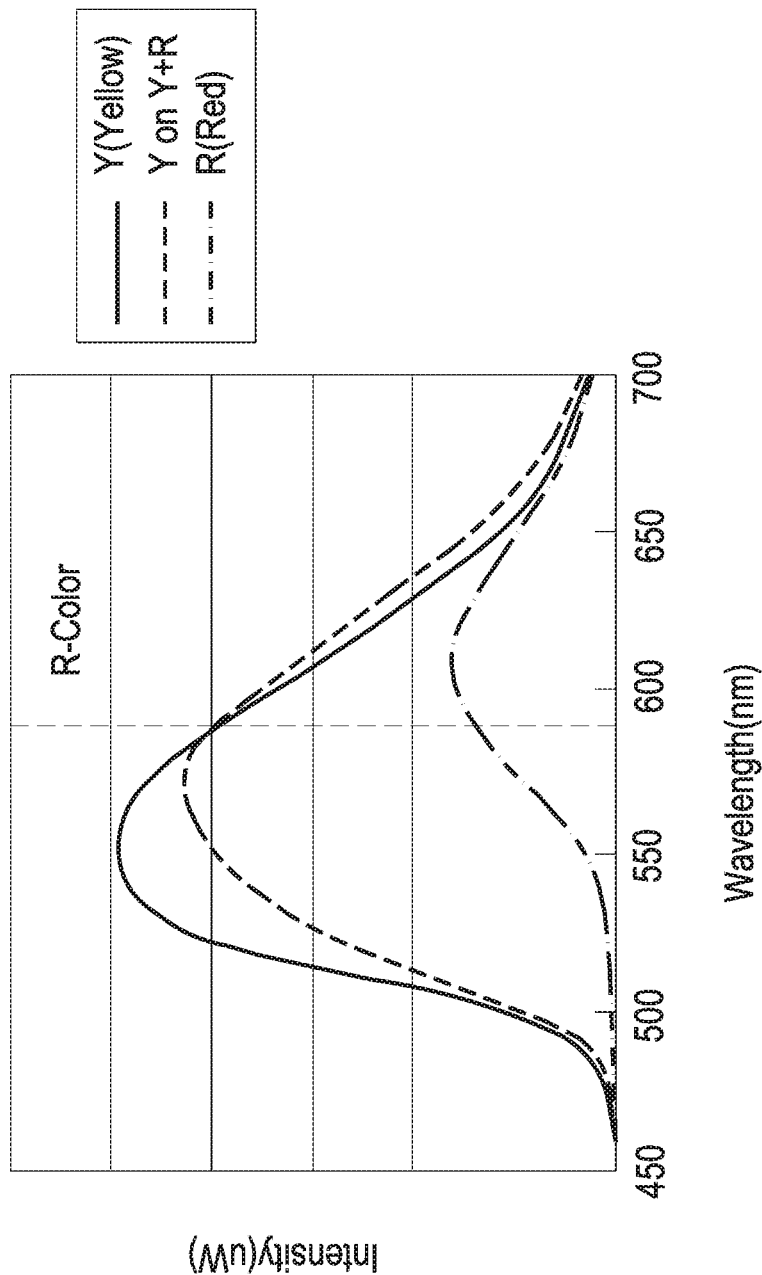
FIG. 5 schematically illustrates an intensity-wavelength diagram of visible lights of a phosphor device including a yellow phosphor agent and a red phosphor agent of the present invention, and a phosphor device utilizing a yellow phosphor agent and a phosphor device utilizing a red phosphor agent of prior art.

Please refer to FIG. 1, FIG. 3 and FIG. 5. FIG. 5 schematically illustrates an intensity-wavelength diagram of visible lights of a phosphor device including a yellow phosphor agent as the second phosphor layer 12, and a yellow phosphor agent mixed with a red phosphor agent as the second phosphor layer 11 of the present invention. It is the comparison with a phosphor device utilizing a yellow phosphor agent and a phosphor device utilizing a red phosphor agent of prior art. FIG. 5 indicates that the intensities of red light (in the R-Color region) of the phosphor device 1 of the present invention shown in FIG. 3 (i.e. the curve Y on Y+R), a phosphor device utilizing a yellow phosphor agent of prior art (i.e. the curve Y) and a phosphor device utilizing a red phosphor agent of prior art (i.e. the curve R). Obviously, the intensity of red light of the phosphor device 1 of the present invention is greater the one of prior art. Furthermore, the following Table I illustrates a comparison data. The weight percentage of the second phosphor agent R is 25% relative to the first phosphor agent Y. The intensity of red light of the phosphor device utilizing a yellow phosphor agent of prior art is assumed as 100% for being the base of the comparison.

TABLE I

| L1 Power (Watts) | Intensity of red light (Y) | Intensity of red light (Y on Y + 25 wt % R) |
|---|---|---|
| 25 | 100.0% | 121.5% |
| 76 | 100.0% | 116.7% |
| 102 | 100.0% | 116.0% |
| 152 | 100.0% | 111.9% |
| 170 | 100.0% | 110.5% |

Figure 6B:
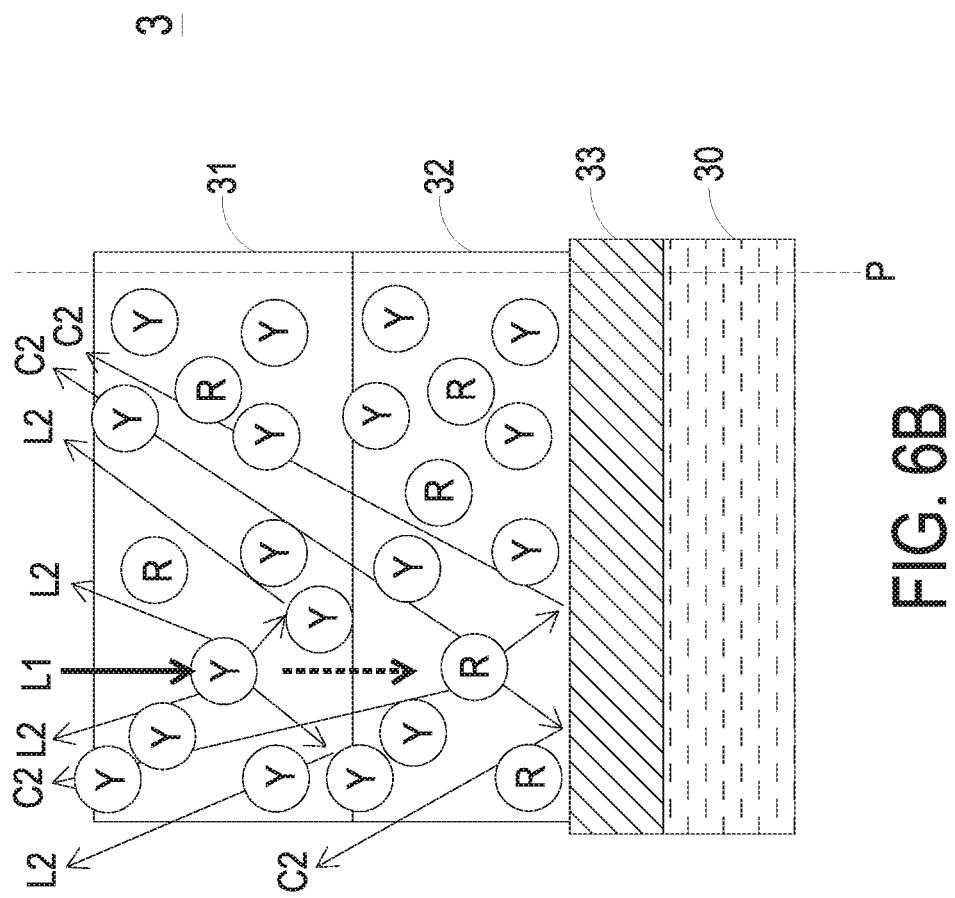
FIG. 6B schematically illustrates the structure of the phosphor device as shown in FIG. 6A.

FIG. 6A schematically illustrates a phosphor device including a reflective substrate and an illumination system including the phosphor device according to an embodiment of the present invention. FIG. 6B schematically illustrates the structure of the phosphor device as shown in FIG. 6A. As shown in FIG. 6A and FIG. 6B, a phosphor device 3 including a reflective substrate of an illumination system 4 is disclosed herein. The illumination system 4 emits a first waveband light L1 along an optical path P. The phosphor device 3 includes a substrate 30, a first phosphor layer 31 and a second phosphor layer 32. The substrate 30 is disposed on the optical path P. The first phosphor layer 31 is formed on a side of the substrate 30. The second phosphor layer 32 is formed behind the first phosphor layer 31 along the optical path P. The first phosphor layer 31 includes a first phosphor agent Y and x weight percent (i.e. x wt %) of a second phosphor agent R. The second phosphor layer 32 includes the first phosphor agent Y and y weight percent (i.e. y wt %) of the second phosphor agent R, and y is greater than x (y>x). The first waveband light L1 is converted into a second waveband light L2 by the first phosphor agent Y. The second waveband light L2 includes a first color light C1 and a second color light C2. The first waveband light L1 is converted into the second color light C2 by the second phosphor agent R, thereby increasing the luminous intensity of the second color light C2.

Particularly, x is greater than 0, and y is less than 85. The relationship between x and y is given by 0<x<y<85. That is, the first phosphor layer 31 and the second phosphor layer 32 each includes a specific weight percent of the second phosphor agent R for converting the first waveband light L1 into the second color light C2 in range of 0-85, and the weight concentration of the second phosphor agent R of the second phosphor layer 32 is greater than the weight concentration of the second phosphor agent R of the first phosphor layer 31. In this embodiment, the first phosphor layer 31 is disposed for mainly decreasing the energy of the first waveband light.

The thickness of each of the first phosphor layer 31 and the second phosphor layer 32 is greater than or equal to 10 micrometers, and less than or equal to 500 micrometers. In preferred embodiments, the thickness of each of the first phosphor layer 31 and the second phosphor layer 32 is greater than or equal to 50 micrometers, and less than or equal to 200 micrometers.

FIG. 7A schematically illustrates a phosphor device including a transmissive substrate and an illumination system including the phosphor device according to an embodiment of the present invention. FIG. 7B schematically illustrates the structure of the phosphor device as shown in FIG. 7A. As shown in FIG. 7A and FIG. 7B, a phosphor device 3 including a transmissive substrate of an illumination system 4 is disclosed herein. The illumination system 4 emits a first waveband light L1 along an optical path P. The phosphor device 3 includes a substrate 30, a first phosphor layer 31 and a second phosphor layer 32. The substrate 30, the first phosphor layer 31 and the second phosphor layer 32 are similar with the above-mentioned embodiment shown in FIGS. 6A and 6B, and are not redundantly described herein. The only difference between this embodiment and the embodiment shown in FIGS. 6A and 6B is that the substrate 30 shown in FIG. 6B is a reflective substrate, and the substrate 30 shown in FIG. 7B is a transmissive substrate.

Table II illustrates a comparison data. The intensity of red light of the phosphor device utilizing a red phosphor agent of prior art is assumed as 100% for being the base of the comparison.

TABLE II

| L1 Power (Watts) | Intensity of red light (Y) | Intensity of red light (R) | Intensity of red light (Y on Y + 25 wt % R) | Intensity of red light (Y + 3.3 wt % R on Y + 25 wt % R) |
|---|---|---|---|---|
| 25 | 84.9% | 100.0% | 102.1% | 109.8% |
| 76 | 119.0% | 100.0% | 138.5% | 138.8% |
| 102 | 134.0% | 100.0% | 154.3% | 151.2% |
| 152 | 162.7% | 100.0% | 182.5% | 173.6% |

From the above descriptions, the present invention provides a phosphor device and a manufacturing method thereof. By utilizing a phosphor layer including a first phosphor agent and a second phosphor agent, the luminous intensity of a color light, which is included in a second waveband light converted by the first phosphor agent, can be increased through the conversion of the second phosphor agent. Meanwhile, since a second phosphor layer including a first phosphor agent and a second phosphor agent is formed behind a first phosphor layer includes only the first phosphor agent along an optical path, most of the energy of a first waveband light is decreased by the first phosphor agent of the first phosphor layer, such that the conversion efficiency of the second phosphor agent is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor device of an illumination system, the illumination system emitting a first waveband light, the phosphor device comprising:
   a substrate; and
   a first phosphor layer, comprising:
      a first phosphor agent formed on the substrate for converting the first waveband light into a second waveband light, wherein the second waveband light comprises a first color light and a second color light; and
      a second phosphor agent distributed over the first phosphor agent for converting the first waveband light into the second color light so as to increase the luminous intensity of the second color light.

2. The phosphor device according to claim 1 further comprising a second phosphor layer, wherein the substrate is a reflective substrate, the second phosphor layer is disposed on the first phosphor layer, the second phosphor layer comprises the first phosphor agent for converting the first waveband light into the second color light and decreasing the energy of the first waveband light.

3. The phosphor device according to claim 2, wherein the residue power of the first waveband light inputted from the second phosphor layer into the first phosphor layer is less than 40 watts.

4. The phosphor device according to claim 2, wherein the thickness of each of the first phosphor layer and the second phosphor layer is greater than or equal to 50 micrometers, and less than or equal to 200 micrometers.

5. The phosphor device according to claim 2, wherein the weight percentage of the second phosphor agent is less than 85% relative to the first phosphor agent.

6. The phosphor device according to claim 2 further comprising a reflective coating, wherein the reflective coating is disposed between the substrate and the first phosphor layer for reflecting the second waveband light.

7. The phosphor device according to claim 1 further comprising a second phosphor layer, wherein the substrate is a transmissive substrate, the second phosphor layer is disposed between the first phosphor layer and the transmissive substrate, the second phosphor layer comprises the first phosphor agent for converting the first waveband light into the second color light and decreasing the energy of the first waveband light.

8. The phosphor device according to claim 7, wherein the residue power of the first waveband light inputted into the first phosphor layer is less than 40 watts.

9. The phosphor device according to claim 7, wherein the thickness of each of the first phosphor layer and the second phosphor layer is greater than or equal to 50 micrometers, and less than or equal to 200 micrometers.

10. The phosphor device according to claim 7, wherein the weight percentage of the second phosphor agent is less than 85% relative to the first phosphor agent.

11. The phosphor device according to claim 7 further comprising a reflective coating, wherein the reflective coating is disposed between the substrate and the second phosphor layer for reflecting the second waveband light.

12. A phosphor device of an illumination system, the illumination system emitting a first waveband light along an optical path, the phosphor device comprising:
    a substrate disposed on the optical path;
    a first phosphor layer formed on a side of the substrate; and
    a second phosphor layer formed behind the first phosphor layer along the optical path,
    wherein the first phosphor layer comprises a first phosphor agent and x weight percent of a second phosphor agent, the second phosphor layer comprises the first phosphor agent and y weight percent of the second phosphor agent, y is greater than x, the first waveband light is converted into a second waveband light by the first phosphor agent, the second waveband light comprises a first color light and a second color light, and the first waveband light is converted into the second color light by the second phosphor agent, thereby increasing the luminous intensity of the second color light.

13. The phosphor device according to claim 12, wherein x is greater than 0 and y is less than 85.

14. The phosphor device according to claim 12, wherein the thickness of each of the first phosphor layer and the second phosphor layer is greater than or equal to 10 micrometers, and less than or equal to 500 micrometers.

15. A phosphor device of an illumination system, the illumination system emitting a first waveband light to the phosphor device so as to be converted into a second waveband light, the phosphor device comprising:
    a substrate; and
    a first phosphor layer formed on the substrate, comprising:
       a first ingredient, wherein the first waveband light is converted into a first color light and a second color light by the first ingredient; and
       a second ingredient distributed over the first ingredient for converting the first waveband light into a third color light, wherein the range of the spectrum of the second color light and the range of the spectrum of the third color light are at least partially overlapped, and the first color light, the second color light and the third color light are integrated as the second waveband light.

16. The phosphor device according to claim 15 further comprising a second phosphor layer, wherein the second phosphor layer comprises the first ingredient for simultaneously converting the first waveband light into the first color light and the second color light and decreasing the energy of the first waveband light, and the first waveband light is sequentially passed through the second phosphor layer and entered the first phosphor layer along an optical path.

17. The phosphor device according to claim 15 further comprising a second phosphor layer, wherein the second phosphor layer comprises the first ingredient and the second ingredient, and the first waveband light is sequentially passed through the second phosphor layer and entered the first phosphor layer along an optical path, and wherein the ratio of the second ingredient to the first ingredient of the first phosphor layer is y, the ratio of the second ingredient to the first ingredient of the second phosphor layer is x, and y is greater than x, and x is equal to or greater than 0.

18. A phosphor device of an illumination system, the illumination system emitting a first waveband light to the phosphor device along an optical path so as to be converted into a second waveband light, the phosphor device comprising:
 a substrate;
 a first phosphor layer formed on the substrate, comprising:
  a first ingredient, wherein the first waveband light is converted into a first color light and a second color light by the first ingredient; and
  a second ingredient distributed over the first ingredient of the first phosphor layer for converting the first waveband light into a third color light; and
 a second phosphor layer, comprising:
  the first ingredient, wherein the first waveband light is converted into the first color light and the second color light by the first ingredient; and
  the second ingredient distributed over the first ingredient of the second phosphor layer for converting the first waveband light into the third color light,
 wherein the thickness of each of the first phosphor layer and the second phosphor layer is greater than or equal to 10 micrometers, and less than or equal to 500 micrometers, the first waveband light is sequentially passed through the second phosphor layer and entered the first phosphor layer along the optical path, the range of the spectrum of the second color light and the range of the spectrum of the third color light are at least partially overlapped, and the first color light, the second color light and the third color light are integrated as the second waveband light.

19. The phosphor device according to claim 18, wherein the ratio of the second ingredient to the first ingredient of the first phosphor layer is y, and the ratio of the second ingredient to the first ingredient of the second phosphor layer is x, and wherein y is greater than x, and x is equal to or greater than 0.

20. A manufacturing method of a phosphor device, comprising steps of:
 providing a substrate;
 forming a first phosphor layer on the substrate, wherein the first phosphor layer comprises a first phosphor agent for converting a first waveband light into a second waveband light comprising a first color light and a second color light, and comprises a second phosphor agent for converting the first waveband light into the second color light, thereby increasing the luminous intensity of the second color light outputted by the phosphor device.

21. A manufacturing method of a phosphor device, comprising steps of:
 providing a reflective substrate;
 forming a first phosphor layer on the reflective substrate, wherein the first phosphor layer comprises a first phosphor agent for converting a first waveband light into a second waveband light comprising a first color light and a second color light, and comprises a second phosphor agent for converting the first waveband light into the second color light, thereby increasing the luminous intensity of the second color light outputted by the phosphor device; and
 forming a second phosphor layer on the first phosphor layer, wherein the second phosphor layer comprises the first phosphor agent for converting the first waveband light into the second waveband light and decreasing the energy of the first waveband light.

22. A manufacturing method of a phosphor device, comprising steps of:
 providing a transmissive substrate;
 forming a second phosphor layer on the transmissive substrate, wherein the second phosphor layer comprises a first phosphor agent for converting a first waveband light into a second waveband light and decreasing the energy of the first waveband light;
 forming a first phosphor layer on the second phosphor layer, wherein the first phosphor layer comprises the first phosphor agent for converting the first waveband light into the second waveband light comprising a first color light and a second color light, and comprises a second phosphor agent for converting the first waveband light into the second color light, thereby increasing the luminous intensity of the second color light outputted by the phosphor device.

* * * * *